US009778946B2

(12) United States Patent
Naik

(10) Patent No.: US 9,778,946 B2
(45) Date of Patent: Oct. 3, 2017

(54) OPTIMIZED COPY OF VIRTUAL MACHINE STORAGE FILES

(75) Inventor: Dilip Naik, Redmond, WA (US)

(73) Assignee: Dell Software Inc., Aliso Viejo, CA (US)

( * ) Notice: Subject to any disclaimer, the term of this patent is extended or adjusted under 35 U.S.C. 154(b) by 0 days.

(21) Appl. No.: 12/537,831

(22) Filed: Aug. 7, 2009

(65) Prior Publication Data

US 2011/0035358 A1 Feb. 10, 2011

(51) Int. Cl.
*G06F 17/30* (2006.01)
*G06F 9/455* (2006.01)

(52) U.S. Cl.
CPC .... *G06F 9/45558* (2013.01); *G06F 17/30067* (2013.01); *G06F 17/30073* (2013.01); *G06F 17/30088* (2013.01); *G06F 17/30575* (2013.01); *G06F 2009/45562* (2013.01)

(58) Field of Classification Search
CPC ......... G06F 17/30067; G06F 17/30073; G06F 17/30088; G06F 17/30575
USPC ................................. 707/644, 647, 650, 653
See application file for complete search history.

(56) References Cited

U.S. PATENT DOCUMENTS

| | | |
|---|---|---|
| 4,130,867 A | 12/1978 | Bachman et al. |
| 4,648,031 A | 3/1987 | Jenner |
| 4,665,520 A | 5/1987 | Strom et al. |
| 4,916,608 A | 4/1990 | Shultz |
| 5,222,235 A | 6/1993 | Hintz et al. |
| 5,297,279 A | 3/1994 | Bannon et al. |
| 5,325,505 A | 6/1994 | Hoffecker et al. |
| 5,333,314 A | 7/1994 | Masai et al. |
| 5,414,650 A | 5/1995 | Hekhuis |
| 5,422,979 A | 6/1995 | Eichfeld et al. |
| 5,423,037 A | 6/1995 | Hvasshovd |
| 5,455,945 A | 10/1995 | VanderDrift |
| 5,530,855 A | 6/1996 | Satoh et al. |
| 5,551,020 A | 8/1996 | Flax et al. |
| 5,553,303 A | 9/1996 | Hayashi et al. |
| 5,596,504 A | 1/1997 | Tata et al. |
| 5,596,747 A | 1/1997 | Katabami et al. |
| 5,634,052 A | 5/1997 | Morris |
| 5,640,561 A | 6/1997 | Satoh et al. |
| 5,655,081 A | 8/1997 | Bonnell et al. |
| 5,664,186 A | 9/1997 | Bennett |
| 5,721,915 A | 2/1998 | Sockut et al. |
| 5,758,356 A | 5/1998 | Hara et al. |
| 5,761,667 A | 6/1998 | Koeppen |
| 5,761,677 A | 6/1998 | Senator et al. |
| 5,774,717 A | 6/1998 | Porcaro |

(Continued)

OTHER PUBLICATIONS

"Data Deduplication Deep Dive, How to Put Data Storage on a Diet", InfoWorld, Mar. 2010, in 5 pages.

(Continued)

*Primary Examiner* — Mark E Hershley
(74) *Attorney, Agent, or Firm* — Winstead PC

(57) ABSTRACT

A facility is described for optimizing the copying of virtual machine storage files. In various embodiments, the facility refrains from copying portions of the virtual machine storage file that do not contain any meaningful data for the purposes of the guest file system within the virtual machine storage file. In some embodiments, the facility refrains from copying portions of the file that are in use by the guest file system, but are of no practical value.

16 Claims, 2 Drawing Sheets

(56) References Cited

U.S. PATENT DOCUMENTS

| | | |
|---|---|---|
| 5,778,377 A | 7/1998 | Marlin et al. |
| 5,778,392 A | 7/1998 | Stockman et al. |
| 5,796,934 A | 8/1998 | Bhanot et al. |
| 5,799,322 A | 8/1998 | Mosher, Jr. |
| 5,822,780 A | 10/1998 | Schutzman |
| 5,848,416 A | 12/1998 | Tikkanen |
| 5,893,924 A | 4/1999 | Vakkalagadda |
| 5,933,818 A | 8/1999 | Kasravi et al. |
| 5,933,820 A | 8/1999 | Beier et al. |
| 5,940,832 A | 8/1999 | Hamada et al. |
| 5,943,677 A | 8/1999 | Hicks |
| 5,948,108 A | 9/1999 | Lu et al. |
| 5,951,694 A | 9/1999 | Choquier et al. |
| 5,951,695 A | 9/1999 | Kolovson |
| 5,956,489 A | 9/1999 | San Andres et al. |
| 5,956,504 A | 9/1999 | Jagadish et al. |
| 5,978,594 A | 11/1999 | Bonnell et al. |
| 5,983,239 A | 11/1999 | Cannon |
| 5,990,810 A | 11/1999 | Williams |
| 5,991,761 A | 11/1999 | Mahoney et al. |
| 5,995,958 A | 11/1999 | Xu |
| 6,003,022 A | 12/1999 | Eberhard et al. |
| 6,016,497 A | 1/2000 | Suver |
| 6,026,412 A | 2/2000 | Sockut et al. |
| 6,029,195 A | 2/2000 | Herz |
| 6,067,410 A * | 5/2000 | Nachenberg .................. 703/28 |
| 6,067,545 A | 5/2000 | Wolff |
| 6,070,170 A | 5/2000 | Friske et al. |
| 6,119,128 A | 9/2000 | Courter et al. |
| 6,122,640 A | 9/2000 | Pereira |
| 6,151,607 A | 11/2000 | Lomet |
| 6,157,932 A | 12/2000 | Klein et al. |
| 6,185,699 B1 | 2/2001 | Haderle et al. |
| 6,243,715 B1 | 6/2001 | Bogantz et al. |
| 6,253,212 B1 | 6/2001 | Loaiza et al. |
| 6,289,357 B1 | 9/2001 | Parker |
| 6,314,421 B1 | 11/2001 | Sharnoff et al. |
| 6,343,296 B1 | 1/2002 | Lakhamraju et al. |
| 6,363,387 B1 | 3/2002 | Ponnekanti et al. |
| 6,411,964 B1 | 6/2002 | Iyer et al. |
| 6,460,048 B1 | 10/2002 | Teng et al. |
| 6,470,344 B1 | 10/2002 | Kothuri et al. |
| 6,477,535 B1 | 11/2002 | Mirzadeh |
| 6,499,039 B1 | 12/2002 | Venkatesh et al. |
| 6,519,613 B1 | 2/2003 | Friske et al. |
| 6,523,035 B1 | 2/2003 | Fleming et al. |
| 6,584,474 B1 | 6/2003 | Pereira |
| 6,606,626 B1 | 8/2003 | Ponnekanti |
| 6,631,478 B1 | 10/2003 | Wang et al. |
| 6,671,721 B1 | 12/2003 | Branson et al. |
| 6,681,386 B1 | 1/2004 | Amin et al. |
| 6,691,139 B2 | 2/2004 | Ganesh et al. |
| 6,721,742 B1 | 4/2004 | Uceda-Sosa et al. |
| 6,728,780 B1 | 4/2004 | Hebert |
| 6,834,290 B1 | 12/2004 | Pugh et al. |
| 6,859,889 B2 | 2/2005 | Matsuura et al. |
| 6,907,512 B2 | 6/2005 | Hill et al. |
| 6,950,834 B2 | 9/2005 | Huras et al. |
| 6,959,441 B2 | 10/2005 | Moore |
| 7,065,538 B2 | 6/2006 | Aronoff et al. |
| 7,085,900 B2 | 8/2006 | Inagaki et al. |
| 7,093,086 B1 | 8/2006 | van Rietschote |
| 7,340,486 B1 | 3/2008 | Chapman |
| 7,370,164 B1 | 5/2008 | Nagarkar et al. |
| 7,447,854 B1 | 11/2008 | Cannon |
| 7,461,103 B2 | 12/2008 | Aronoff et al. |
| 7,546,325 B2 | 6/2009 | Kamei et al. |
| 7,610,331 B1 | 10/2009 | Genske et al. |
| 7,657,581 B2 | 2/2010 | Orenstein et al. |
| 7,669,020 B1 | 2/2010 | Shah et al. |
| 7,707,185 B1 | 4/2010 | Czezatke et al. |
| 7,752,487 B1 | 7/2010 | Feeser et al. |
| 7,765,400 B2 | 7/2010 | Costea et al. |
| 7,769,722 B1 | 8/2010 | Bergant et al. |
| 7,797,284 B1 | 9/2010 | Chellappa et al. |
| 7,805,423 B1 | 9/2010 | Romine et al. |
| 7,844,577 B2 * | 11/2010 | Becker et al. .................. 707/646 |
| 7,849,267 B2 | 12/2010 | Lam et al. |
| 7,895,161 B2 | 2/2011 | Sugimoto et al. |
| 7,925,850 B1 | 4/2011 | Waldspurger et al. |
| 1,016,129 A1 | 6/2011 | Vengerov et al. |
| 8,001,596 B2 | 8/2011 | Wollnik et al. |
| 8,010,495 B1 * | 8/2011 | Kuznetzov et al. .......... 707/649 |
| 8,046,550 B2 | 10/2011 | Feathergill |
| 8,056,076 B1 * | 11/2011 | Hutchins .............. G06F 9/461 |
| | | 707/639 |
| 8,060,476 B1 | 11/2011 | Afonso et al. |
| 8,135,930 B1 | 3/2012 | Mattox et al. |
| 8,151,263 B1 * | 4/2012 | Venkitachalam ....... G06F 9/485 |
| | | 711/162 |
| 8,166,265 B1 | 4/2012 | Feathergill |
| 8,250,033 B1 | 8/2012 | De Souter et al. |
| 8,286,019 B2 | 10/2012 | Murase |
| 8,335,902 B1 | 12/2012 | Feathergill |
| 8,412,848 B2 | 4/2013 | Therrien et al. |
| 8,464,214 B2 | 6/2013 | Miloushev et al. |
| 8,627,198 B2 | 1/2014 | Martinsen et al. |
| 8,656,386 B1 * | 2/2014 | Baimetov .......... G06F 9/45558 |
| | | 709/219 |
| 8,930,423 B1 * | 1/2015 | Surampudi ........ H04L 63/0428 |
| | | 380/259 |
| 2003/0145074 A1 | 7/2003 | Penick |
| 2004/0024961 A1 | 2/2004 | Cochran et al. |
| 2004/0030822 A1 | 2/2004 | Rajan et al. |
| 2004/0236803 A1 | 11/2004 | Spiegeleer |
| 2005/0114614 A1 | 5/2005 | Anderson et al. |
| 2005/0278280 A1 | 12/2005 | Semerdzhiev et al. |
| 2006/0005189 A1 * | 1/2006 | Vega et al. ...................... 718/1 |
| 2006/0020932 A1 * | 1/2006 | Bentz et al. .................. 717/140 |
| 2006/0143501 A1 * | 6/2006 | Tormasov .......... G06F 11/1417 |
| | | 714/6.3 |
| 2006/0155735 A1 * | 7/2006 | Traut et al. .................. 707/101 |
| 2006/0218544 A1 * | 9/2006 | Chakraborty et al. ........ 717/168 |
| 2007/0208918 A1 * | 9/2007 | Harbin et al. ................ 711/162 |
| 2007/0234334 A1 * | 10/2007 | Araujo et al. ................ 717/168 |
| 2007/0244938 A1 | 10/2007 | Michael et al. |
| 2007/0260831 A1 * | 11/2007 | Michael .............. G06F 9/4401 |
| | | 711/162 |
| 2008/0082593 A1 | 4/2008 | Komarov et al. |
| 2008/0155208 A1 | 6/2008 | Hiltgen et al. |
| 2008/0177994 A1 * | 7/2008 | Mayer ............................ 713/2 |
| 2008/0201414 A1 * | 8/2008 | Amir Husain et al. ....... 709/203 |
| 2008/0244028 A1 | 10/2008 | Le et al. |
| 2008/0244577 A1 | 10/2008 | Le et al. |
| 2008/0250406 A1 | 10/2008 | Carpenter et al. |
| 2008/0256139 A1 * | 10/2008 | Jessee ................ G06F 11/1435 |
| 2009/0007100 A1 | 1/2009 | Field et al. |
| 2009/0089781 A1 | 4/2009 | Shingai et al. |
| 2009/0150463 A1 * | 6/2009 | Sekiguchi .......... G06F 9/44505 |
| 2009/0158432 A1 * | 6/2009 | Zheng et al. .................... 726/24 |
| 2009/0216816 A1 | 8/2009 | Basler et al. |
| 2009/0216970 A1 | 8/2009 | Basler et al. |
| 2009/0240904 A1 | 9/2009 | Austruy et al. |
| 2009/0265403 A1 | 10/2009 | Fukumoto |
| 2009/0300023 A1 | 12/2009 | Vaghani |
| 2010/0030983 A1 | 2/2010 | Gupta et al. |
| 2010/0049930 A1 * | 2/2010 | Pershin .............. G06F 11/1451 |
| | | 711/162 |
| 2010/0058013 A1 | 3/2010 | Gelson et al. |
| 2010/0061702 A1 * | 3/2010 | Tanaka ................ G11B 27/329 |
| | | 386/241 |
| 2010/0070725 A1 | 3/2010 | Prahlad et al. |
| 2010/0076934 A1 | 3/2010 | Pershin et al. |
| 2010/0077165 A1 | 3/2010 | Lu et al. |
| 2010/0088277 A1 | 4/2010 | Rao et al. |
| 2010/0115332 A1 * | 5/2010 | Zheng et al. ...................... 714/6 |
| 2010/0122248 A1 * | 5/2010 | Robinson et al. ................ 718/1 |
| 2010/0185587 A1 * | 7/2010 | Lovinger .......... G06F 17/30079 |
| | | 707/660 |
| 2010/0228913 A1 | 9/2010 | Czezatke et al. |
| 2010/0235813 A1 * | 9/2010 | Manczak et al. ............. 717/121 |
| 2010/0235831 A1 * | 9/2010 | Dittmer ............................ 718/1 |
| 2010/0235832 A1 | 9/2010 | Rajagopal et al. |

(56) References Cited

U.S. PATENT DOCUMENTS

| | | | |
|---|---|---|---|
| 2010/0257331 A1* | 10/2010 | Frank | 711/166 |
| 2010/0262585 A1 | 10/2010 | Rosikiewicz et al. | |
| 2010/0262586 A1 | 10/2010 | Rosikiewicz et al. | |
| 2010/0262802 A1 | 10/2010 | Goebel et al. | |
| 2010/0293140 A1 | 11/2010 | Nishiyama | |
| 2010/0306412 A1 | 12/2010 | Therrien et al. | |
| 2011/0047340 A1 | 2/2011 | Olson et al. | |
| 2011/0145199 A1 | 6/2011 | Prasad Palagummi | |
| 2011/0153697 A1* | 6/2011 | Nickolov et al. | 707/827 |
| 2011/0154325 A1 | 6/2011 | Terasaki | |
| 2011/0225122 A1 | 9/2011 | Denuit et al. | |
| 2012/0084598 A1 | 4/2012 | Alibakhsh et al. | |
| 2012/0109897 A1 | 5/2012 | Janakiraman et al. | |
| 2012/0210417 A1 | 8/2012 | Shieh | |
| 2012/0272240 A1 | 10/2012 | Starks et al. | |
| 2012/0297246 A1 | 11/2012 | Liu et al. | |
| 2013/0007506 A1 | 1/2013 | Jain et al. | |
| 2013/0014102 A1 | 1/2013 | Shah | |
| 2013/0097599 A1 | 4/2013 | Konik et al. | |
| 2013/0151802 A1 | 6/2013 | Bahadure et al. | |
| 2013/0185716 A1 | 7/2013 | Yin et al. | |
| 2013/0246685 A1 | 9/2013 | Bhargava et al. | |

OTHER PUBLICATIONS

"The What, How and Where of Deduplication", Spectra nTier with FalconStor Deduplication, Spectra Logic Corporation, May 2008, in 12 pages.
"Quest SharePlex for Oracle," Brochure, Quest Software, Inc., Nov. 1999, 4 pages.
Space Management and Reorganization: Challenges and Solutions, http://quest.com/whitepapers/space_manager_wp.doc, published on or around Dec. 21, 1999.
"Top Five Tips for Space Management and Reorganization," believed to be published after Jul. 21, 1998, in 2 pages.
Backup Critic, "File Versus Image Backups," retrieved from http://www.backupcritic.com/software-buyer/file-verus-image.html on May 4, 2010, in 3 pages.
Computer Associates, "Platinum OnlineReorg Technical Overview, OnlineReorg", http://platinum.com/products/custstor/tsreorg.htm, 5 pages downloaded on Nov. 30, 1999.
Computer Associates, "Platinum Tsreorg Automates Tablespace Reorganizations, Customer Story", http://platinum.com/products/custstor/tsreorg.htm, 2 pages downloaded on Nov. 30, 1999.
Computer Associates, "ProVision Tsreorg for Oracle, Brochure, Database Utilities Tsreorg for Oracle", http://platinum.com/products/custstor/tsreorg.htm, 4 pages downloaded on Nov. 30, 1999.
Computer Associates, "Rapid Reorg for DB2 for OS/390, Brochure", http://platinum.com/products/custstor/tsreorg.htm, 3 pages downloaded on Nov. 30, 1999.
Data Sheet: Data Protection, "Symantec NetBackup 7, The Symantec NetBackup Platform: Complete protection for your information-driven enterprise," Symantec Corporation, Dec. 2009, in 8 pages.
EMC Deduplication Frequently Asked Questions, http://www.datadomain.com/resources/faq.html, downloaded Jun. 7, 2011, 4 pages.
Harley Stagner, "Aligning disk partitions to boost virtual machine performance", Vmware Management, Migration and Performance, http://searchvmware.techtarget.com/tip/0,289483,sid179_gci1344730_mem1,00.html, Jan. 28, 2009, pp. 1-5.
Jeff Graves, "Partition Alignment", ORCS Web Team Blog, http://www.orcsweb.com/blog, Sep. 14, 2009, pp. 1-2.
Jin, Keren et al.,"The Effectiveness of Deduplication on Virtual Machine Disk Images", SYSTOR 2009, May 2009, in 12 pages.
John Willemse, "VMware disk alignment VMDK settings and align at the 64k boundary blogSphere bug desktop enterprise microsoft server vist . . . ", Planet Lotus, http://planetlotus.org/profiles/john-willemse_49586, Apr. 30, 2009, pp. 1-5 (of 44).

Joseph Pagano, paper on Microsoft Exchange Disaster Recovery Planning, document version 3.00, 1996, in 39 pages.
K. Loney, et al., "Oracle8i, DB Handbook," Oracle Press, 2000, p. 20.
Kleo Bare Metal Backup, Wikipedia, retrieved from http://en.wikipedia.org/wiki/Kleo_Bare_Metal_Backup on Apr. 14, 2010, in 3 pages.
L. Leverenz, et al., "Oracle8i Concepts," Oracle Corp., vol. 2, Release 8.1.5, 1999, p. 20-3.
Laverick, Mike, "VMware ESX 3.x Server and VirtualCenter 2.x (GA Build Eval) Service Console Guide," Document Ver. 1.2, RTFM Education, downloaded Dec. 17, 2008, in 73 pages.
Massiglia, Paul, "Block-Level Incremental Backup", VERITAS Software Corporation, Feb. 2000, in 13 pages.
Microsoft TechNet, Windows Server 2003, retrieved from http://technet.microsoft.com/en-us/library/cc706993(WS.10,printer).aspx on Aug. 3, 2011, in 6 pages.
MSDN, Overview of Processing a Backup Under VSS, retrieved from http://msdn.microsoft.com/en-us/library/aa384589(d=printer,v=VS.85).aspx on Aug. 3, 2011, in 5 pages.
Oracle: Introduction to PL/SQL, Power Point Presentation Regarding Triggers, slides 4, 6-7, 11, 14-17, 28, and 51, http://training.ntsource.com/dpec/COURSES/PL1/plc011.htm, 10 pages downloaded on Oct. 20, 2000.
Tom Hirt, "Importance of Disk Alignment in VMware", VMware Disk Alignment—How-to Align VMware Partitions—Disk, Alignment, Vmfs, Vmdk, Esx, Apr. 9, 2009, pp. 1-15.
Veeam Technology Overview, "The New Standard for Data Protection," Veeaam Software, Apr. 2010, in 2 pages.
Veritas NetBackup for VMware Adminstrator's Guide, Unix, Windows, and Linux, Release 6.5.4, Symantec Corporation, 2009, in 66 pages.
VMware, "Recommendations for Aligning VMFS Partitions", VMware Infrastructure 3, VMware Performance Study, Feb. 2009, pp. 1-10.
VMware, Inc., "VMware Virtual Machine File System: Technical Overview and Best Practices", A VMware Technical White Paper, http://www.vmware.com/support/, 2007, Issue Version 1.0, pp. 1-19.
U.S. Appl. No. 12/566,231, filed Sep. 24, 2009, Feathergill et al.
U.S. Appl. No. 12/762,162, filed Apr. 16, 2010, Mattox.
U.S. Appl. No. 13/156,199, filed Jun. 8, 2011, Feathergill et al.
U.S. Appl. No. 13/218,362, filed Aug. 25, 2011, Feathergill et al.
U.S. Appl. No. 13/244,187, filed Sep. 23, 2011, Afonso et al.
U.S. Appl. No. 13/368,240, filed Feb. 7, 2012, Naik.
Afonso, Delano Xavier, U.S. Appl. No. 13/764,011, filed Feb. 11, 2013.
Armstrong, Ben, "How Do I Fix a Corrupted Virtual Hard Disk?", Virtual PC Guy's Blog, Jan. 7, 2009, in 4 pages.
Microsoft Corporation Technet, "Compacting Dynamically Expanding Virtual Hard Disks", retrieved Feb. 6, 2012, in 2 pages.
Microsoft Corporation Technet, "To Compact a Dynamically Expanding Virtual Hard Disk", retrieved Feb. 6, 2012, in 1 page.
Microsoft Corporation, "Microsoft Windows XP—Compact", Command-line reference A-Z, retrieved Feb. 6, 2012, in 2 pages.
Naik, Dilip, "Virtual Machine Storage—often overlooked optimizations", 2010 Storage Developer Conference, Storage Networking Industry Association, Sep. 2010, in 21 pages.
Russinovich, Mark, "SDelete v1.6", Windows Sysinternals, published Sep. 1, 2011, in 3 pages.
U.S. Appl. No. 13/368,240, filed Feb. 7, 2012, titled "Systems and Methods for Compacting a Virtual Machine File", in 44 pages.
U.S. Appl. No. 12/762,162, filed Apr. 16, 2010, titled "Block Status Mapping System for Reducing Virtual Machine Backup Storage", in 29 pages.
U.S. Appl. No. 13/218,362, filed Aug. 25, 2011, titled "Multitier Deduplication Systems and Methods", 50 pages.
U.S. Appl. No. 13/850,164, filed Mar. 25, 2013, Feathergill.

* cited by examiner

OPTIMIZED COPY OF VIRTUAL MACHINE STORAGE FILES

BACKGROUND

Virtual machines are commonly used by individuals, businesses, organizations, and other entities. A virtual machine is a self-contained, isolated software environment that runs its own operating system(s) and applications as if it were a physical computer. A virtual machine behaves like a physical computer, but comprises software components. Several virtual machines can all execute on the same physical computer. A physical computer includes one or more processors, computer readable media (e.g., memory), storage devices, input/output devices, etc.

A virtual machine comprises a collection of files, with the exact number being dependent upon the nature of the virtualization product being used. Irrespective of the virtualization product being used, all virtual machines have a file known as the "virtual machine storage file." As an example, with VMWARE® products, this is commonly referred to as a VMDK file. With MICROSOFT® and CITRIX® products, this is instead referred to as a VHD file. These specific references to VMDK and VHD files are made only in the interest of clarity. One skilled in the art would recognize that other file types may also be used.

A single virtual machine may have more than one virtual machine storage file associated with it. A virtual machine storage file typically comprises at least one volume with a file system within it.

Some virtual machine storage files contain not just a guest file system, but also an operating system, referred to as the guest operating system. For example, a virtual machine running MICROSOFT EXCHANGE SERVER may have two virtual machine storage files—one containing a WINDOWS operating system plus MICROSOFT EXCHANGE software and a second one containing data for MICROSOFT EXCHANGE. The references to specific products made herein are simply in the interests of clarity.

System administrators sometimes need to copy virtual machine storage files from one location to another. Some illustrative, but by no means comprehensive set of examples are provided for clarification purposes. Virtualization enables easier load balancing, and load balancing requires moving a virtual machine from one physical host system to another. Virtual machine storage files are sometimes needed to be copied when virtual machine management software establishes a library, with the means to check virtual machines into the library, and check out virtual machines from the library. Each check in and checkout operation leads to copying of virtual machine storage files.

Programs and tools exist to copy files from one location to another. Some periodically create checkpoints and allow for the copy operation to be resumed from the checkpoint in case a previous copy operation was not completed. This feature is highly useful when copying large files across significant geographic distances. Some file-copy programs tune the size of the I/O to the state of the connection between the source and destination of the copy operation.

DETAILED DESCRIPTION

A software and/or hardware facility ("the facility") for optimizing the copying of virtual machine storage files is described. The term "source virtual machine storage file" or just "source" is used to refer to the file that is being copied. The term "destination" refers to the location where the file is being copied. The facility performs an optimized virtual machine storage file copy operation that takes into account what portions of the virtual machine storage file are relevant, and only copies those portions in various embodiments. The facility determines not only the nature of the file system contained within the virtual machine storage file, but also what parts of the virtual machine storage file contain meaningful data (as indicated by said file system).

Figure 1:
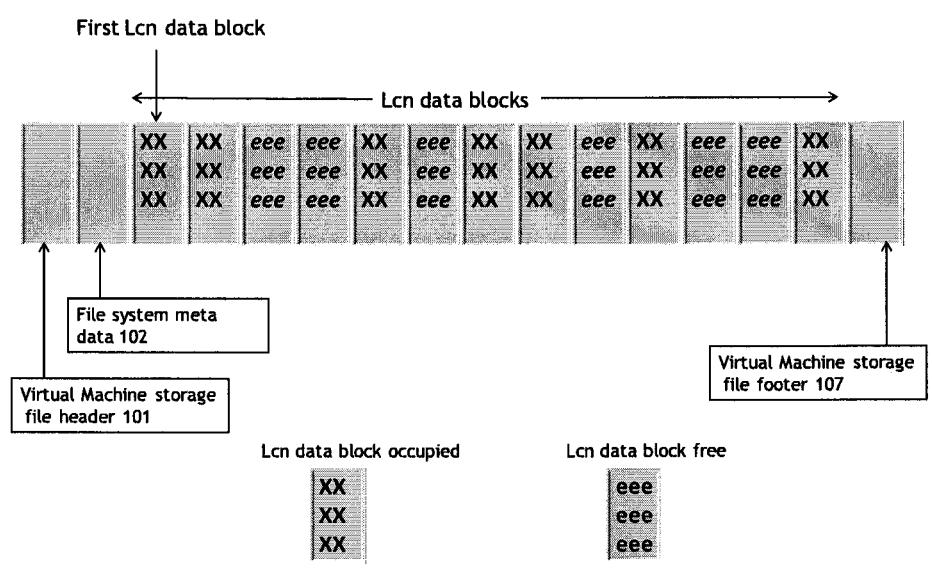
FIG. 1 is a block diagram illustrating a virtual machine storage file layout in some embodiments.

FIG. 1 shows the layout of a typical virtual machine storage file. The file begins with an optional virtual machine storage file header 101, followed by some file system metadata 103. File systems typically divide the volume into entities referred to as logical clusters. The file system metadata 103 includes a bitmap describing which logical clusters are being used and which ones are free. FIG. 1 illustrates the logical cluster data blocks 105. Hereafter, this document refers to logical clusters using the term Lcn. The virtual machine storage file typically ends with a virtual machine storage file footer 107. To speed up operation and derive other benefits, the facility does not copy the Lcn data blocks indicated as free.

In some embodiments, the facility utilizes operating system application program interfaces (APIs) to access the virtual machine storage file as both a file and a volume. These APIs are provided by the operating system within which the facility is executing. For example, in MICROSOFT WINDOWS version 7 and MICROSOFT WINDOWS 2008 R2 operating systems, the facility utilizes the OpenVirtualDisk and AttachVirtualDisk APIs to access the virtual machine storage file as a read-only volume attached to the operating system within which the facility is executing. Thereafter, the facility can use operating system provided APIs such as FSCTL_GET_NTFS_DATA to determine useful information such as the storage allocation unit (also referred to as a cluster size) of the guest file system contained within the virtual machine storage file. Other examples of this include FSCTL_GET_VOLUME_BITMAP, which enables the facility to determine which clusters the guest file system is using, and IOCTL_VOLUME_LOGICAL_TO_PHYSICAL, which the facility uses to determine the first and last clusters of the guest file system located within the virtual machine storage file. In some embodiments, the facility always copies the portions of the virtual machine prior to the first cluster and after the last cluster. In other embodiments, alternate schemes may be employed. However the facility only copies Lcn data blocks if the Lcn bitmap indicates that particular portion is in use by the guest file system. (NOTE: In some embodiments, the facility fills the unused portions with zeros). In some embodiments, the facility fills the unused portions with zeros in the destination file.

In some embodiments, the facility utilizes its own API library to access the virtual machine storage file as both a file and a volume. This can be true when the facility executes in an operating system environment that does not provide APIs to access the volume(s) contained within the virtual machine storage file. Examples of such APIs include, but are not limited to OpenVirtualDisk and AttachVirtualDisk APIs in Microsoft Windows 7 and Microsoft Windows Server 2008 R2. Another example is when the facility is executing within an operating system that does not support the semantics of the guest file system contained within the virtual machine storage file.

In some embodiments, the facility ignores certain portions of the machine storage file that the guest file system indicates are in use. These portions pertain to files that are deemed non-essential. Examples include not copying the Lcn data blocks occupied by the hibernation file, and the paging file. (Note: these are simply examples, not a comprehensive list.) The exact details of what files are deemed non-essential depend upon the nature of the guest file system, and the intended use of the newly copied virtual machine file.

Figure 2:
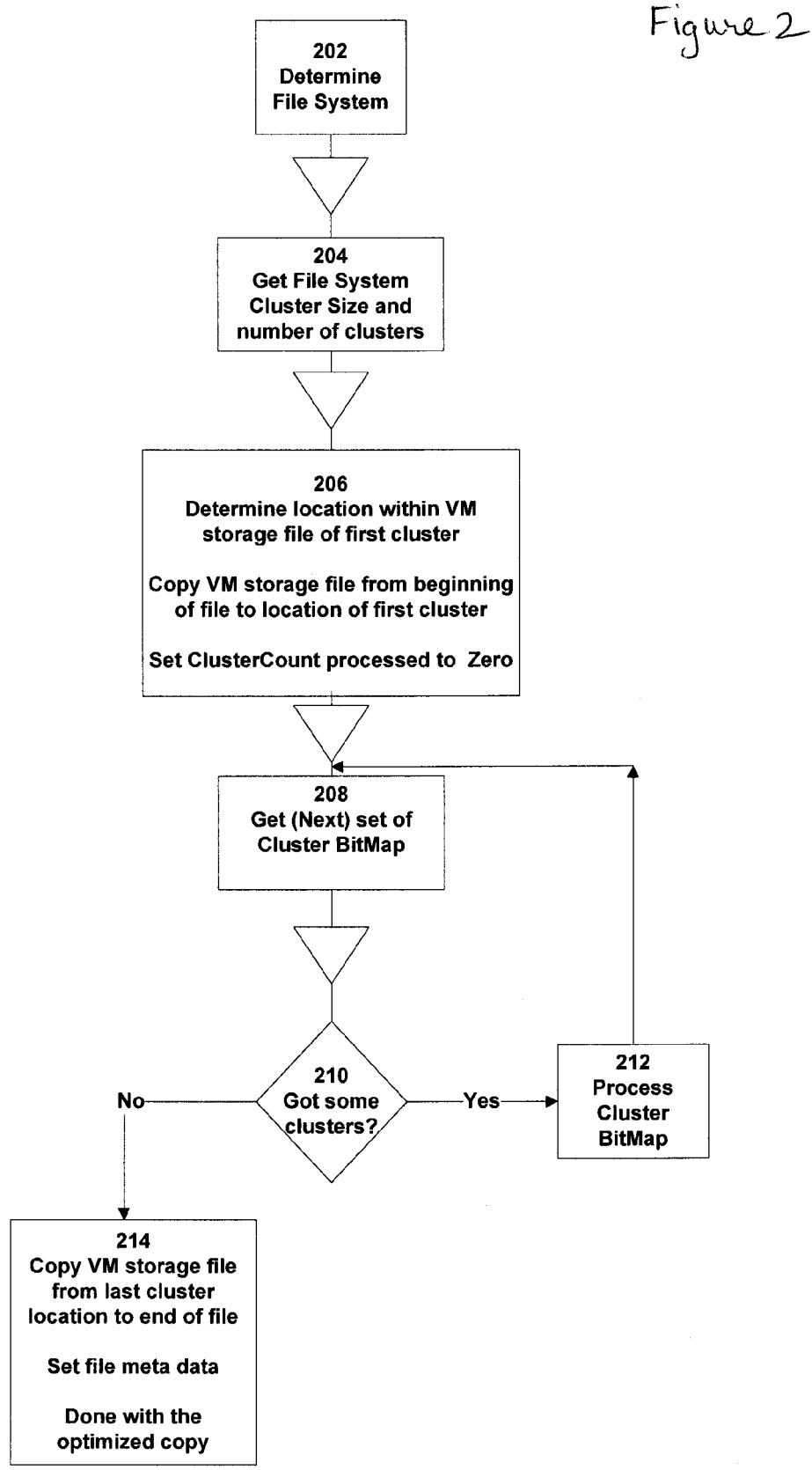
FIG. 2 is a flow diagram illustrating logic employed by some embodiments of the facility.

FIG. 2 is a flow diagram illustrating a routine performed by the facility in some embodiments. At block 202, the routine determines the nature of the file system contained within the virtual machine storage file. This is determined in a number of different possible ways. When the routine is executing on an operating system that provides the required APIs, the virtual machine storage file is mounted and accessed as a volume. In the MICROSOFT WINDOWS version 7 family of operating systems, this would be by using the OpenVirtualDisk and AttachVirtualDisk APIs. The result is that the facility can determine a handle to the mounted volume of interest.

Once the routine has obtained a handle to the volume of interest, it can determine the file system by using the FSCTL_FILESYSTEM_GET_STATISTICS or the FSCTL_QUERY_FILE_SYSTEM_RECOGNITION API. Some embodiments of the facility use alternative means such as a built in API library to determine the file system within the virtual machine storage file.

In some embodiments, the routine uses NTFS file system specific APIs. Different embodiments of the facility that can handle guest file systems other than NTFS use different but similar APIs. The references to NTFS are in the interest of clarity and by no means should be constructed to limit the facility to operate only on NTFS guest file systems.

At block 204, the facility uses API FSCTL_GET_NTFS_VOLUME_DATA to determine the file system cluster size, and also the number of logical clusters present within the guest file system. Logical clusters are an administrative unit that file systems typically divide the volume they cover into. Each logical cluster is X bytes in size, the size being determined when the volume is formatted with the file system. File systems also typically track the clusters to determine whether they are free or in use, by utilizing a data structure called an Lcn bitmap. Each bit in the bitmap represents one logical cluster data block in the volume.

At block 206, the facility determines the location of the first cluster data block within the virtual machine storage file. The facility accomplishes this by using the API IOCTL_VOLUME_LOGICAL_TO_PHYSICAL, after which it copies all of the data from the beginning of the virtual machine storage file to this location.

At block 208, the facility retrieves the Logical Cluster Number (Lcn) bit map, N bits at a time. This can be accomplished using the FSCTL_GET_VOLUME_BITMAP API.

At decision block 210, the facility determines whether it has received clusters. Once a set of N Lcn bitmaps are obtained, they are processed by the logic of block 212. To process, the facility determines if a cluster bitmap indicates the data is in use. If so, the corresponding data is copied from the source file to the destination file. However, if the bit indicates the cluster is not in use, the source and destination file pointers are advanced by the size of the cluster.

When the N obtained Lcn bitmap bits are all processed, the facility loops to the logic of block 208 to obtain another bitmap set containing data for N or fewer clusters.

When all the bitmap data for a volume has been obtained and processed, the facility continues at block 214. The facility copies all of the remaining contents of the source virtual machine storage file that are after the last Lcn data block, to the corresponding offset in the destination virtual machine storage file. This includes the virtual machine storage file footer 107. The routine then returns at block 216.

In various embodiments, when a virtual machine storage file contains multiple volumes (and file systems), the facility operates on the virtual machine storage file one file system volume at a time.

Thus, the facility treats the contents of the VHD file as a non opaque structure during the file copy operation AND while the VHD is not running.

We claim:

1. A method performed by a host computer system for performing an optimized copy of virtual machine storage files, the method comprising:
under control of a physical host computer system configured to execute virtual machines associated with virtual machine storage files, the physical host computer system having executing thereon a physical host operating system that provides one or more application programming interfaces (APIs):
mounting, as a volume, on the physical host computer system, a virtual machine storage file associated with one of the virtual machines;
determining a handle of the mounted volume via the one or more APIs of the physical host operating system;
wherein the virtual machine storage file comprises guest system metadata and a guest file system;
wherein the guest file system comprises a plurality of logical clusters having a file system cluster size expressible in bytes;
wherein the guest system metadata comprises a cluster bitmap, the cluster bitmap comprising information on whether each logical cluster of the guest file system is in use by the guest file system;
identifying the guest file system included in the virtual machine storage file via the handle and the one or more APIs of the physical host operating system;
obtaining, via the one or more APIs of the physical host operating system, the file system cluster size of the guest file system and a number of logical clusters in the plurality of logical clusters of the guest file system;
identifying, via the one or more APIs of the physical host operating system, a location within the virtual machine storage file of the first logical cluster of the guest file system;
copying, to a destination file, the virtual machine storage file from a beginning of the virtual machine storage file to the identified location of the first logical cluster of the guest file system;
accessing the cluster bitmap for information on whether each logical cluster in the guest file system is in use by the guest file system;

for each logical cluster of the plurality of logical clusters, determining, from the cluster bitmap, whether the logical cluster is in use by the guest file system;

for each logical cluster of the plurality of logical clusters, responsive to a determination that the logical cluster is not in use by the guest file system, advancing file pointer of the destination file by the file system cluster size without copying the logical cluster to the destination file; and for each logical cluster of the plurality of logical clusters, responsive to a determination that the logical cluster is in use by the guest file system, copying the logical cluster to the destination file.

2. The method of claim 1 further comprising:
determining from the accessed cluster bitmap whether additional clusters remain to be processed; and
if additional clusters remain to be processed, further processing the cluster bitmap.

3. The method of claim 1 further comprising:
identifying a location within the virtual machine storage file of the last cluster of the guest file system; and
copying, to the destination file, the virtual machine storage file from the identified location of the last cluster of the guest file system to an end of the virtual machine storage file.

4. The method of claim 3 further comprising setting file meta data.

5. The method of claim 1 further comprising avoiding copying blocks occupied by a hibernation file or a paging file associated with the guest file system.

6. The method of claim 1 wherein the virtual machine storage file being copied comprises a guest operating system image associated with the guest file system.

7. The method of claim 1 wherein the virtual machine storage file being copied comprises the guest file system, but does not comprise a guest operating system image.

8. The method of claim 1 wherein the virtual machine storage file being copied comprises a single volume embedded within the virtual machine storage file.

9. The method of claim 1 wherein the virtual machine storage file being copied comprises multiple volumes embedded within the virtual machine storage file.

10. The method of claim 1 wherein the virtual machine storage file comprises a Microsoft specified VHD file format.

11. The method of claim 1 wherein the virtual machine storage file comprises a VMware specified VMDK file format.

12. The method of claim 1 wherein the virtual machine storage file is copied to multiple destination files.

13. The method of claim 1 further comprising:
determining, from the accessed cluster bitmap, clusters in the guest file system that are free; and
filling with zeroes portions of the destination file associated with the clusters determined to be free.

14. The method of claim 1 wherein accessing the virtual machine storage file comprises accessing the virtual machine storage file as a read-only volume attached to a host operating system of the host computer system.

15. A system for copying virtual machine storage files, the system comprising a physical host computer system configured to execute a virtual machine, the virtual machine associated with a guest operating system and a guest file system, the physical host computer system having executing thereon a physical host operating system that provides one or more application programming interfaces (APIs), the physical host computing system configured to implement a method comprising:

mounting, as a volume, on the physical host computer system, a virtual machine storage file associated with one of the virtual machines;

determining a handle of the mounted volume via the one or more APIs of the physical host operating system;

wherein the virtual machine storage file comprises guest system metadata and a guest file system;

wherein the guest file system comprises a plurality of logical clusters having a file system cluster size expressible in bytes;

wherein the guest system metadata comprises a cluster bitmap, the cluster bitmap comprising information on whether each logical cluster of the guest file system is in use by the guest file system;

identifying the guest file system included in the virtual machine storage file via the handle and the one or more APIs of the physical host operating system;

obtaining, via the one or more APIs of the physical host operating system, the file system cluster size of the guest file system and a number of logical clusters in the plurality of logical clusters of the guest file system;

identifying, via the one or more APIs of the physical host operating system, a location within the virtual machine storage file of the first logical cluster of the guest file system;

copying, to a destination file, the virtual machine storage file from a beginning of the virtual machine storage file to the identified location of the first logical cluster of the guest file system;

accessing the cluster bitmap for information on whether each logical cluster in the guest file system is in use by the guest file system;

for each logical cluster of the plurality of logical clusters, determining, from the cluster bitmap, whether the logical cluster is in use by the guest file system;

for each logical cluster of the plurality of logical clusters, responsive to a determination that the logical cluster is not in use by the guest file system, advancing file pointer of the destination file by the file system cluster size without copying the logical cluster to the destination file; and for each logical cluster of the plurality of logical clusters, responsive to a determination that the logical cluster is in use by the guest file system, copying the logical cluster to the destination file.

16. A computer-program product comprising a non-transitory computer-usable medium having computer-readable program code embodied therein, the computer-readable program code adapted to be executed to implement a method, the method being performed by an agent installed in a computing environment on a computer system, the method comprising:

mounting, as a volume, on a physical host computer system, a virtual machine storage file associated with a virtual machine;

determining a handle of the mounted volume via one or more APIs provided by a physical host operating system executing on the physical host computer system;

wherein the virtual machine storage file comprises guest system metadata and a guest file system;

wherein the guest file system comprises a plurality of logical clusters having a file system cluster size expressible in bytes;

wherein the guest system metadata comprises a cluster bitmap, the cluster bitmap comprising information on whether each logical cluster of the guest file system is in use by the guest file system;

identifying the guest file system included in the virtual machine storage file via the handle and the one or more APIs of the physical host operating system;

obtaining, via the one or more APIs of the physical host operating system, the file system cluster size of the guest file system and a number of logical clusters in the plurality of logical clusters of the guest file system;

identifying, via the one or more APIs of the physical host operating system, a location within the virtual machine storage file of the first logical cluster of the guest file system;

copying, to a destination file, the virtual machine storage file from a beginning of the virtual machine storage file to the identified location of the first logical cluster of the guest file system;

accessing the cluster bitmap for information on whether each logical cluster in the guest file system is in use by the guest file system;

for each logical cluster of the plurality of logical clusters, determining, from the cluster bitmap, whether the logical cluster is in use by the guest file system;

for each logical cluster of the plurality of logical clusters, responsive to a determination that the logical cluster is not in use by the guest file system, advancing file pointer of the destination file by the file system cluster size without copying the logical cluster to the destination file; and for each logical cluster of the plurality of logical clusters, responsive to a determination that the logical cluster is in use by the guest file system, copying the logical cluster to the destination file.

* * * * *